(12) United States Patent
Woods et al.

(10) Patent No.: US 9,555,980 B2
(45) Date of Patent: Jan. 31, 2017

(54) INLET FOR PARTICULATE LOADER

(71) Applicants: Kent Gregory Woods, Swift Current (CA); Joseph Robert Parisien, Swift Current (CA); Paul Kerr, Hodgeville (CA)

(72) Inventors: Kent Gregory Woods, Swift Current (CA); Joseph Robert Parisien, Swift Current (CA); Paul Kerr, Hodgeville (CA)

(73) Assignee: AG GROWTH INDUSTRIES PARTNERSHIP, Winnipeg, Manitoba (CA)

( * ) Notice: Subject to any disclaimer, the term of this patent is extended or adjusted under 35 U.S.C. 154(b) by 95 days.

(21) Appl. No.: 14/157,842

(22) Filed: Jan. 17, 2014

(65) Prior Publication Data

US 2015/0147125 A1 May 28, 2015

(30) Foreign Application Priority Data

Nov. 22, 2013 (CA) ..................................... 2834116

(51) Int. Cl.
*B65G 53/40* (2006.01)
*B65G 53/64* (2006.01)

(52) U.S. Cl.
CPC ..................... *B65G 53/64* (2013.01)

(58) Field of Classification Search
CPC ................ B65G 53/14; B65G 53/24
USPC ....... 406/116, 39, 41, 53, 82, 151, 168, 169, 406/195; 222/415
See application file for complete search history.

(56) References Cited

U.S. PATENT DOCUMENTS

| | | | | |
|---|---|---|---|---|
| 3,235,314 A | * | 2/1966 | Schorer ................. | A01D 87/10 406/116 |
| 4,019,641 A | * | 4/1977 | Merz ..................... | B65G 53/24 406/116 |
| 4,111,670 A | * | 9/1978 | DeMarco .............. | B01D 50/00 15/340.1 |
| 4,344,723 A | * | 8/1982 | Ellingson .............. | B65G 53/60 406/168 |
| 4,436,457 A | * | 3/1984 | Willingham .......... | B65G 53/52 406/116 |

(Continued)

*Primary Examiner* — Joseph Dillon, Jr.
(74) *Attorney, Agent, or Firm* — Thompson Hine LLP

(57) ABSTRACT

A particulate loader for transferring particulates. The particulate loader comprises an air-particulates separating chamber for separating the particulates from an air stream caused by suction provided thereto. A suction mechanism is connected to the air-particulates separating chamber for providing the suction thereto. The particulate loader comprises a conveying mechanism for conveying the separated particulates from the air-particulates separating chamber to a remote location. A vacuum pickup hose is in fluid communication with the air-particulates separating chamber for transmitting the airstream with the particulates therethrough. An inlet conduit is in fluid communication with the vacuum pickup hose at a first end and with the air-particulates separating chamber at a second end for transmitting the airstream with the particulates from the vacuum pickup hose to the air-particulates separating chamber. The inlet conduit is elongated between the first end and the second end and a cross-section of the inlet conduit increases from a first cross-section at the first end to a second cross-section at the second end.

16 Claims, 5 Drawing Sheets

(56) References Cited

U.S. PATENT DOCUMENTS

| | | | | |
|---|---|---|---|---|
| 4,470,729 A * | 9/1984 | Fredenburg | ............ | B65G 53/52 406/116 |
| 4,661,046 A * | 4/1987 | Ruyle | .................... | A01C 3/026 406/116 |
| 4,662,800 A * | 5/1987 | Anderson | ............... | B65G 65/32 210/402 |
| 4,881,855 A * | 11/1989 | Rempel | .................. | B65G 53/60 198/671 |
| 5,341,856 A * | 8/1994 | Appenzeller | .......... | B65G 53/28 141/231 |
| 5,575,596 A * | 11/1996 | Bauer | .................... | B65G 53/24 406/132 |
| 6,158,926 A * | 12/2000 | Precetti | .................. | B65F 1/127 100/100 |
| 6,223,387 B1 * | 5/2001 | Anderson | ............... | A01G 1/125 15/340.1 |
| 6,332,239 B1 * | 12/2001 | Dubos | .................... | A47L 9/104 15/327.2 |
| 7,278,804 B2 * | 10/2007 | Deal | .................... | E21B 21/062 175/206 |
| 7,431,537 B2 | 10/2008 | Francis et al. | | |
| 7,547,162 B2 * | 6/2009 | Rempel | .................. | A01D 87/00 406/151 |
| 7,862,260 B2 * | 1/2011 | Rempel | .................. | A01D 87/00 406/151 |
| 8,764,400 B2 * | 7/2014 | Kerr | .................... | F04D 23/003 416/185 |

* cited by examiner

INLET FOR PARTICULATE LOADER

This application claims priority to Canadian Patent Application No. 2,834,116, entitled INLET FOR PARTICULATE LOADER, filed on Nov. 22, 2013 in the name of REM Enterprises Inc. with Kent Woods, Joseph Parisien and Paul Kerr as inventors. The entire contents of that application are incorporated by reference herein.

FIELD

The present invention relates to a high capacity particulate loader for grains, fertilizers, chemicals, particulates and granular material (hereinafter referred to as "particulates"), and more particularly, relates to an inlet conduit for a particulate loader and transfer apparatus.

BACKGROUND

Particulate loaders are well known, and as described in U.S. Pat. No. 7,431,537, are used by farmers and others to load and transfer grain and other particulates in a convenient manner. These devices include a suction mechanism such as, for example, one or more blowers, to create suction within an air-particulates separating chamber. A vacuum pickup hose is attached to the air-particulates separating chamber to transport grain or other materials from a first location into the air-particulates separating chamber. A conveying mechanism such as, for example, an auger, is positioned in the bottom of the air-particulates separating chamber for transferring the grain or other particulate material from the air-particulates separating chamber to a second location such as, for example an open truck, container.

State of the art particulate loaders have a separating drum of a generally perforated nature disposed within the air-particulates separating chamber for separating the particulates from the air. Typically, the drum is affixed to a fore-and-aft extending shaft about whose axis the drum is rotated during operation. Air drawn through the air-particulates separating chamber passes through the separating drum through small perforations therein, the separating drum's small perforations thereby separating the particulates from the air, leaving the particulate in the air-particulates separating chamber while the air which has passed through the perforations into the separating drum is exhausted through the suction mechanism of the particulate loader.

Unfortunately, a large suction mechanism is required for producing a sufficiently low suction (vacuum) pressure in the air-particulates separating chamber to cause a sufficient air velocity in the vacuum pickup hose to entrain the particulate in the air stream for conveyance. Furthermore, the subsequent high velocity of the air stream entering the air-particulates separating chamber substantially reduces the efficiency of the separation process.

It may be desirable to provide an inlet conduit that reduces the velocity of the air stream with the particulates entering the air-particulates separating chamber.

It also may be desirable to provide an inlet conduit that increases the velocity of the airstream with the particulates through the vacuum pickup hose while a suction pressure provided by the suction mechanism is substantially the same.

It also may be desirable to provide an inlet conduit that has the above desirable characteristics, is simple, and is implementable absent substantial changes to an existing particulate loader design.

SUMMARY

Accordingly, one object of the present invention is to provide an inlet conduit that reduces the velocity of the air stream with the particulates entering the air-particulates separating chamber.

Another object of the present invention is to provide an inlet conduit that increases the velocity of the airstream with the particulates through the vacuum pickup hose while a suction pressure provided by the suction mechanism is substantially the same.

Another object of the present invention is to provide an inlet conduit that has the above desirable characteristics, is simple, and is implementable absent substantial changes to an existing particulate loader design.

According to one aspect of the present invention, there is provided a particulate loader for transferring particulates. The particulate loader comprises an air-particulates separating chamber for separating the particulates from an air stream caused by suction provided thereto. A suction mechanism is connected to the air-particulates separating chamber for providing the suction thereto. The particulate loader comprises a conveying mechanism for conveying the separated particulates from the air-particulates separating chamber to a remote location. A vacuum pickup hose is in fluid communication with the air-particulates separating chamber for transmitting the airstream with the particulates therethrough. An inlet conduit is in fluid communication with the vacuum pickup hose at a first end and with the air-particulates separating chamber at a second end for transmitting the airstream with the particulates from the vacuum pickup hose to the air-particulates separating chamber. The inlet conduit is elongated between the first end and the second end and a cross-section of the inlet conduit increases from a first cross-section at the first end to a second cross-section at the second end.

According to one aspect of the present invention, there is provided a method for transferring particulates. An air-particulates separating chamber is provided. An inlet conduit is interposed between the air-particulates separating chamber and a vacuum pickup hose. The inlet conduit is in fluid communication with the air-particulates separating chamber and is designed such that the velocity of the airstream with the particulates through the vacuum pickup hose is increased while suction provided by the air-particulates separating chamber is substantially the same. A suction mechanism connected to the air-particulates separating chamber provides the suction thereto. Using the vacuum pickup hose in fluid communication with the air-particulates separating chamber the increased airstream with the particulates is transmitted therethrough with the air stream being caused by the suction provided thereto. Using the air-particulates separating chamber the particulates are separated from the air stream. Using a conveying mechanism the separated particulates are conveyed from the air-particulates separating chamber to a remote location.

According to one aspect of the present invention, there is provided a method for transferring particulates. An air-particulates separating chamber is provided. An inlet conduit is interposed between the air-particulates separating chamber and a vacuum pickup hose. The inlet conduit is in fluid communication with the air-particulates separating chamber and is designed such that the velocity of the airstream with the particulates through the vacuum pickup hose is substantially the same while suction provided by the air-particulates separating chamber is reduced. A suction mechanism connected to the air-particulates separating chamber provides the reduced suction thereto. Using the vacuum pickup hose in fluid communication with the air-particulates separating chamber the airstream with the particulates is transmitted therethrough with the air stream being caused by the reduced suction provided thereto. Using the air-particulates separating chamber the particulates are separated from the air stream. Using a conveying mechanism the separated particulates are conveyed from the air-particulates separating chamber to a remote location.

One advantage of the present invention is that it provides an inlet conduit that reduces the velocity of the air stream with the particulates entering the air-particulates separating chamber.

A further advantage of the present invention is that it provides an inlet conduit that increases the velocity of the airstream with the particulates through the vacuum pickup hose while a suction pressure provided by the suction mechanism is substantially the same.

A further advantage of the present invention is that it provides an inlet conduit that has the above desirable characteristics, is simple, and is implementable absent substantial changes to an existing particulate loader design.

BRIEF DESCRIPTION OF THE DRAWINGS

An embodiment of the present invention is described below with reference to the accompanying drawings, in which.

DETAILED DESCRIPTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, certain methods and materials are now described.

Figure 1A:
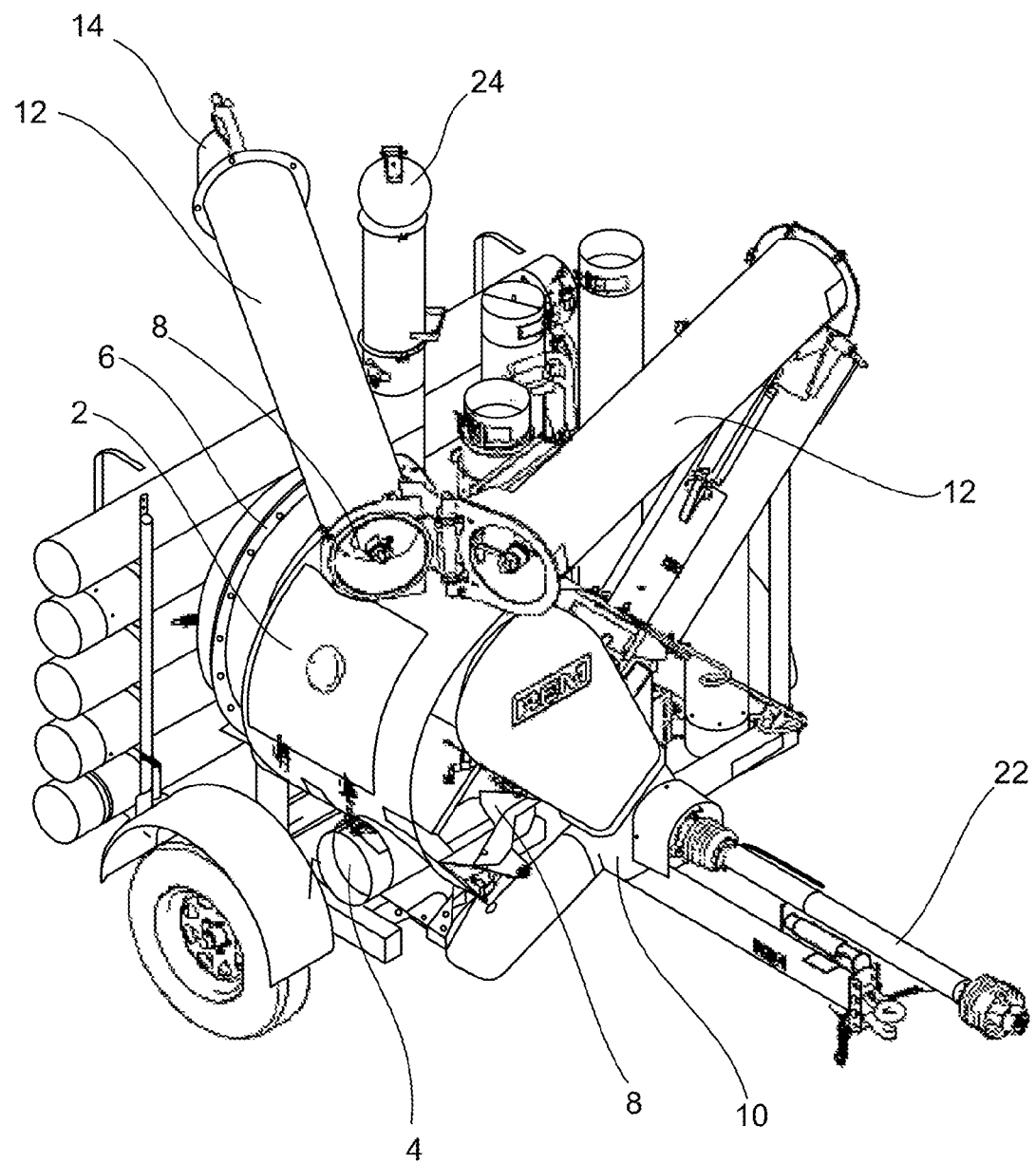
FIGS. 1a and 1b are simplified block diagrams illustrating a front perspective view and a front view, respectively, of a particulate loader and transfer apparatus for use with an inlet conduit according to one embodiment of the invention.
Figure 1B:
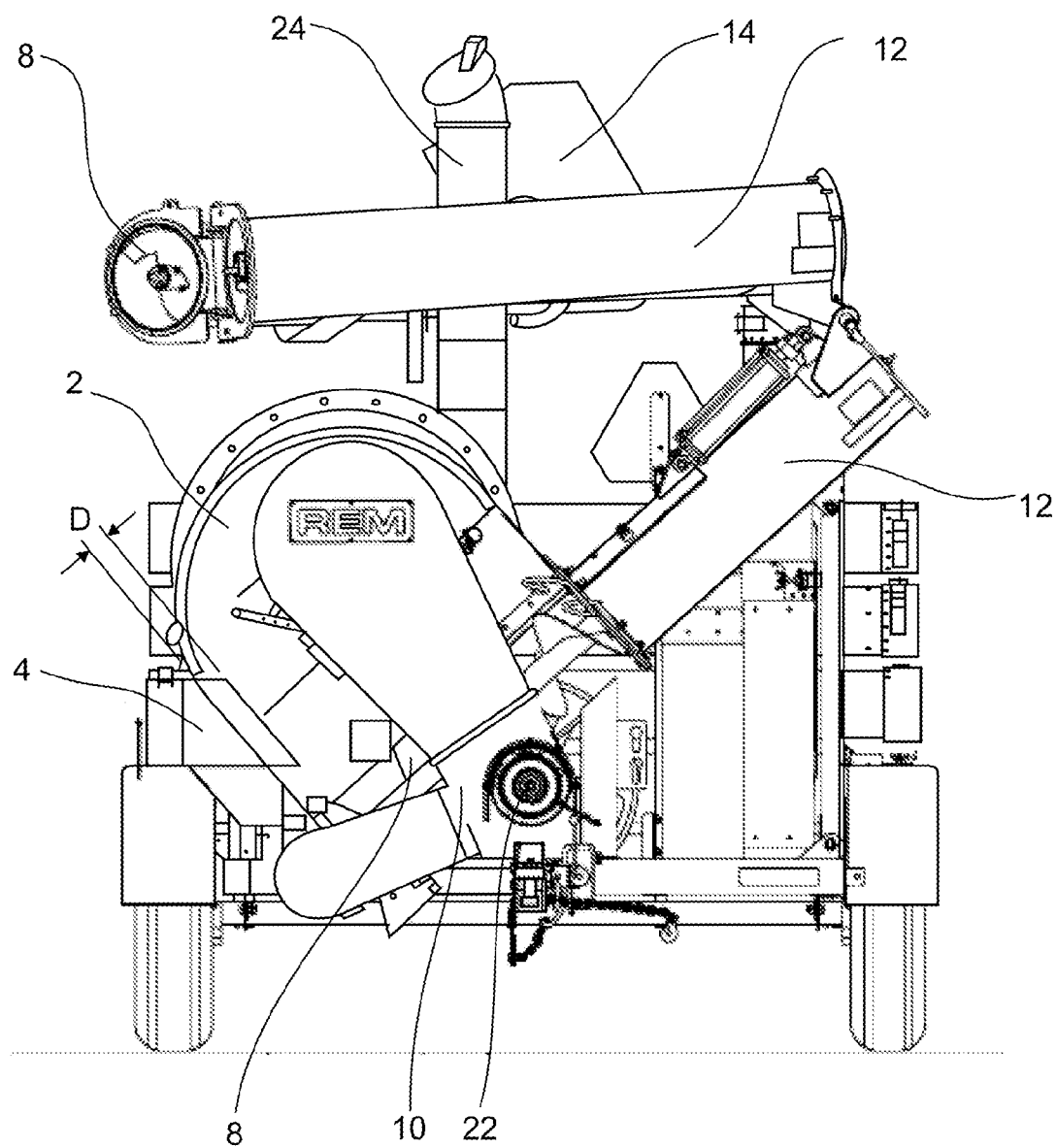

While the description of certain embodiments herein below is with reference to a particulate loader as illustrated in FIGS. 1a and 1b, it will become evident to those skilled in the art that the embodiments of the invention are not limited thereto, but are also applicable for other types of particulate loaders using, for example, different embodiments of separating chambers, suction mechanisms, particulate conveying mechanisms, and drive mechanisms.

In the particulate loader and transfer apparatus illustrated in FIGS. 1a and 1b, an air-particulates separating chamber 2 is generally provided, having an inlet port 4 which is adapted to connect via inlet port coupler 5 to an inlet conduit 100 according to an embodiment of the invention, as will be described hereinbelow. Relatively low pressure is created within: the air-particulates separating chamber 2; the inlet conduit 100; and, the vacuum pickup hose (not shown) connected thereto, by way of one or more air vacuum pumps 6 in communication with the air-particulates separating chamber 2, drawing the particulates through the vacuum pickup hose, the inlet conduit 100, and inlet port 4 and into the air-particulates separating chamber 2. The particulates thereafter separate itself from the airflow within the air-particulates separating chamber 2 (the air-particulates separation can be aided by a separating drum within the air-particulates separating chamber 2 through which separating drum 10 only air, dust and small particles may pass) the particulates falling onto an auger 8 which extends generally upwardly and outwardly from the air-particulates separating chamber 2 and which auger 8 transports the particulate material from the bottom of the air-particulates separating chamber 2, within a tubular housing 12 enclosing the auger tube 8, through an end-dump housing 14 to a waiting truck, container or other particulate storage area, with the auger 8 and the tubular housing 12 being collapsible during transport and storage of the particulate loader, as illustrated in FIGS. 1a and 1b. The air vacuum pump 6, the auger 8, and the separating drum are driven, for example, by way of a drive mechanism 10 and a power takeoff (not shown) by way of a drive shaft 22 in a conventional manner. The air drawn from the air-particulates separating chamber 2 by the centrifugal air vacuum pump 6 is exhausted to atmosphere by way of exhaust outlet 24.

Figure 2A:
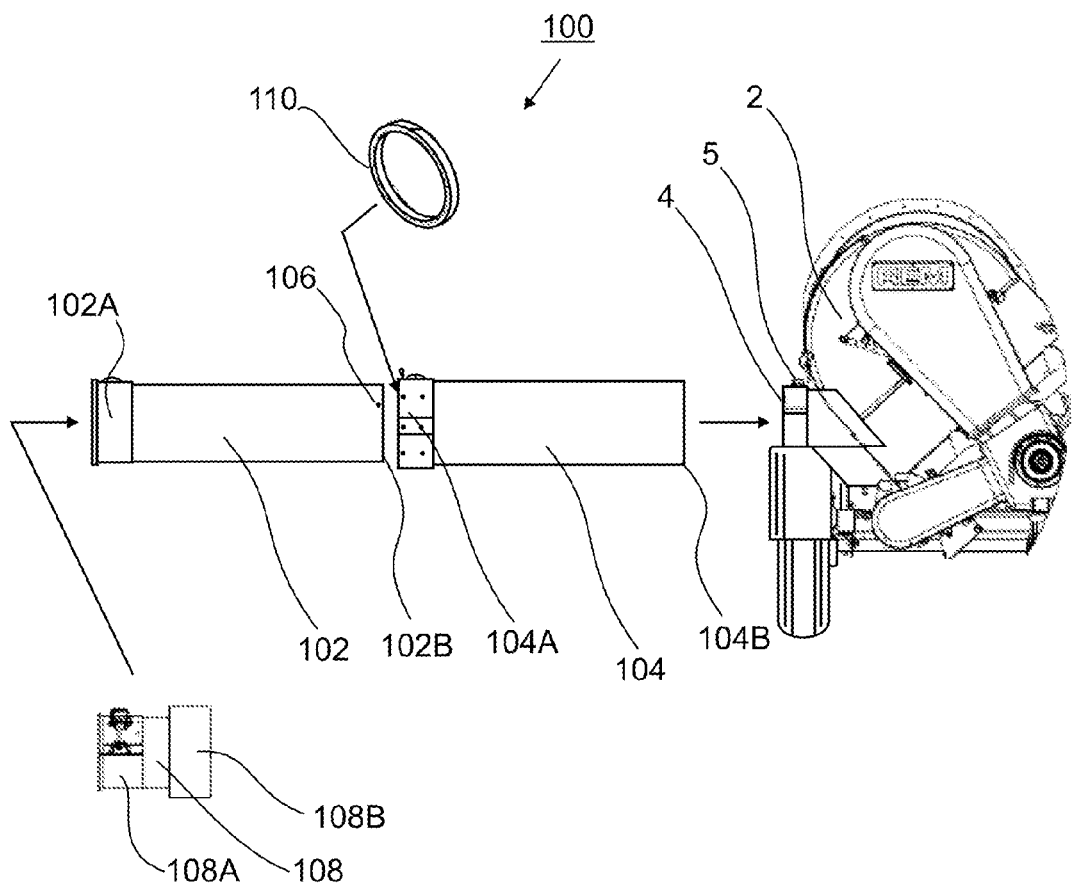
FIG. 2a is a simplified block diagram illustrating an exploded side view of the inlet conduit according to one embodiment of the invention.
Figure 2B:
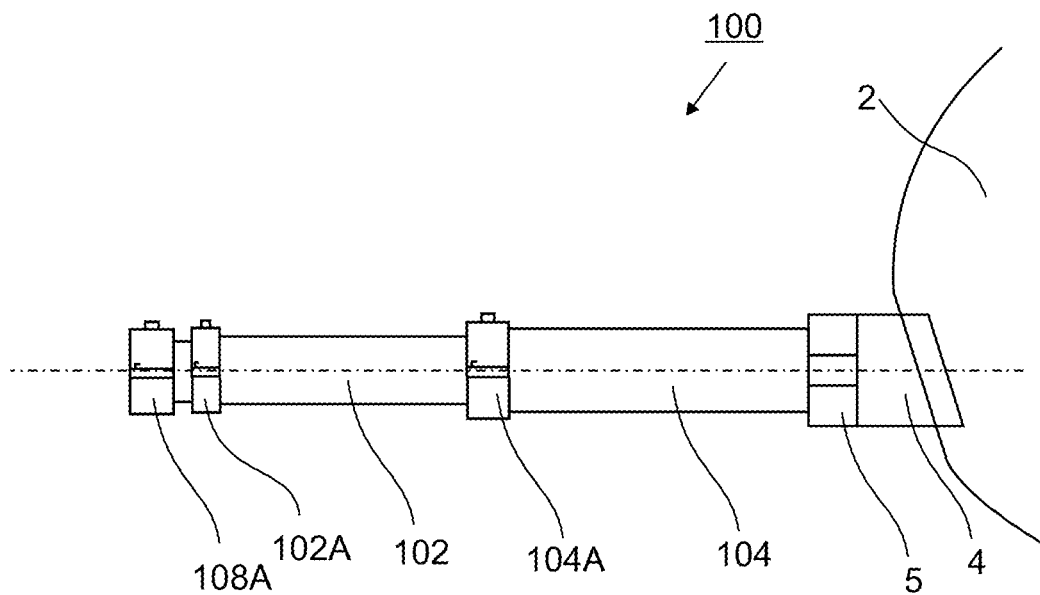
FIGS. 2b and 2c are simplified block diagrams illustrating a side view of the inlet conduit according to one embodiment of the invention with the inlet conduit being in an extended position and a collapsed position, respectively.
Figure 2C:
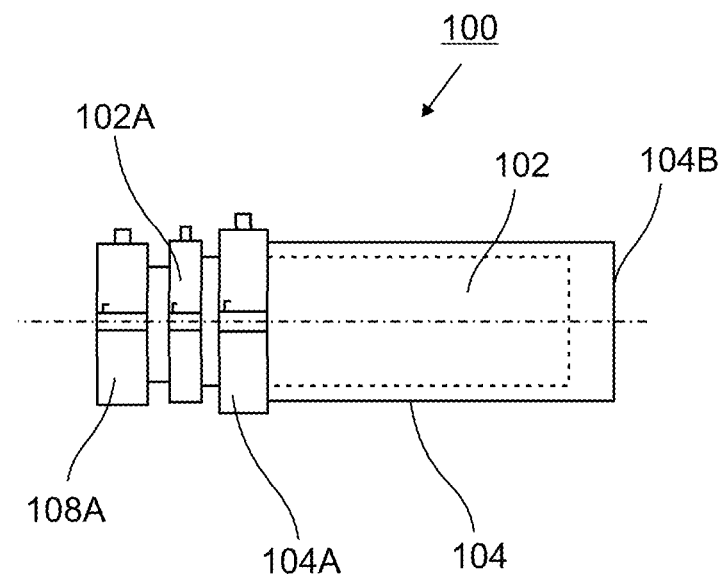

Referring to FIGS. 2a to 2d, an inlet conduit 100 according to an embodiment of the invention is provided. The inlet conduit 100 can comprise inlet conduit element 102 having a substantially constant first cross section and inlet conduit element 104 having a substantially constant second cross section with the second cross section being larger than the first cross section. The inlet conduit elements 102 and 104 can be provided as tubes made of aluminum having a circular cross section using standard manufacturing technologies, but are not limited thereto and may be made of a different material and may have differently shaped cross sections. The inlet conduit element 102 is telescopically movable mounted to the inlet conduit element 104 in a conventional manner via, for example, plastic ring 110 and a clamp mechanism 104A, allowing the inlet conduit element 102 to slide into and out the inlet conduit element 104 when the clamp mechanism 104A is open, as illustrated in FIGS. 2b and 2c. Two rings 110 can be employed to ensure proper clamping and sealing during operation. One or more stops 106 are disposed on end portion 102B of the inlet conduit element 102 for preventing removal of the inlet conduit element 102 from the inlet conduit element 104 by abutting the same in a conventional manner.

End portion 104B of the inlet conduit element 104 is adapted to be coupled in a conventional manner to the inlet port 4 via inlet port clamp mechanism 5. Clamp mechanism 102A of the inlet conduit element 102 is coupled to end portion 108B of vacuum hose adapter 108 which comprises clamp mechanism 108A for coupling the vacuum hose adapter 108 to a standard vacuum hose or pipe in a conventional manner. The vacuum hose adapter 108 increases the cross section from the cross section of the vacuum hose to the first cross section of the inlet conduit element 102.

The inlet conduit 100 is simple to handle and is installed in a conventional manner. During transport, handling and installation the inlet conduit element 102 is nested inside the inlet conduit element 104 except for the clamp mechanism 102A—as indicated by the dashed lines in FIG. 2c—enabling handling of the inlet conduit 100 as a single piece of tubing. After coupling the end portion 104B to the inlet port 4, the inlet conduit 100 is extended by sliding the inlet conduit element 102 out the inlet conduit element 104 and clamping the same using clamp mechanism 104A. After extending, the vacuum hose adapter 108 is coupled thereto using clamp mechanism 102A followed by coupling of the vacuum hose to the vacuum hose adapter 108 using clamp mechanism 108A. The inlet conduit 100 is then ready for use, as illustrated in FIG. 2b. Optionally, the vacuum hose adapter 108 is coupled to the inlet conduit element 102 during transport and handling. After use, the same steps are performed in reverse.

The inlet conduit 100 provides a stepwise increase of the cross section from the cross section of the vacuum hose to the second cross section of the inlet conduit element 104 and the inlet port 4 in two steps with the first increase being provided by the vacuum hose adapter 108 and the second increase being between the inlet conduit elements 102 and 104. When extended, the inlet conduit 100 provides an elongated conduit having an increased first cross section along a substantial portion of its length and a further increased second cross section along another substantial portion of its length.

Alternatively, the inlet conduit 100 comprises only a single step by omitting inlet conduit element 102, or more than two steps by adding, in one case telescopically movable, inlet conduit elements between the inlet conduit elements 102 and 104. Further alternatively, the inlet conduit elements 102 and 104 are not provided telescopically movable but as separate elements for being coupled in a conventional manner. Yet further alternatively, the cross section is continuously increased for the inlet conduit 100 having, for example, a frusto-conical shape.

Further alternatively, the inlet conduit 100 or a portion thereof is integrated into the inlet port 4 of the air-particulates separating chamber 2.

Figure 2D:
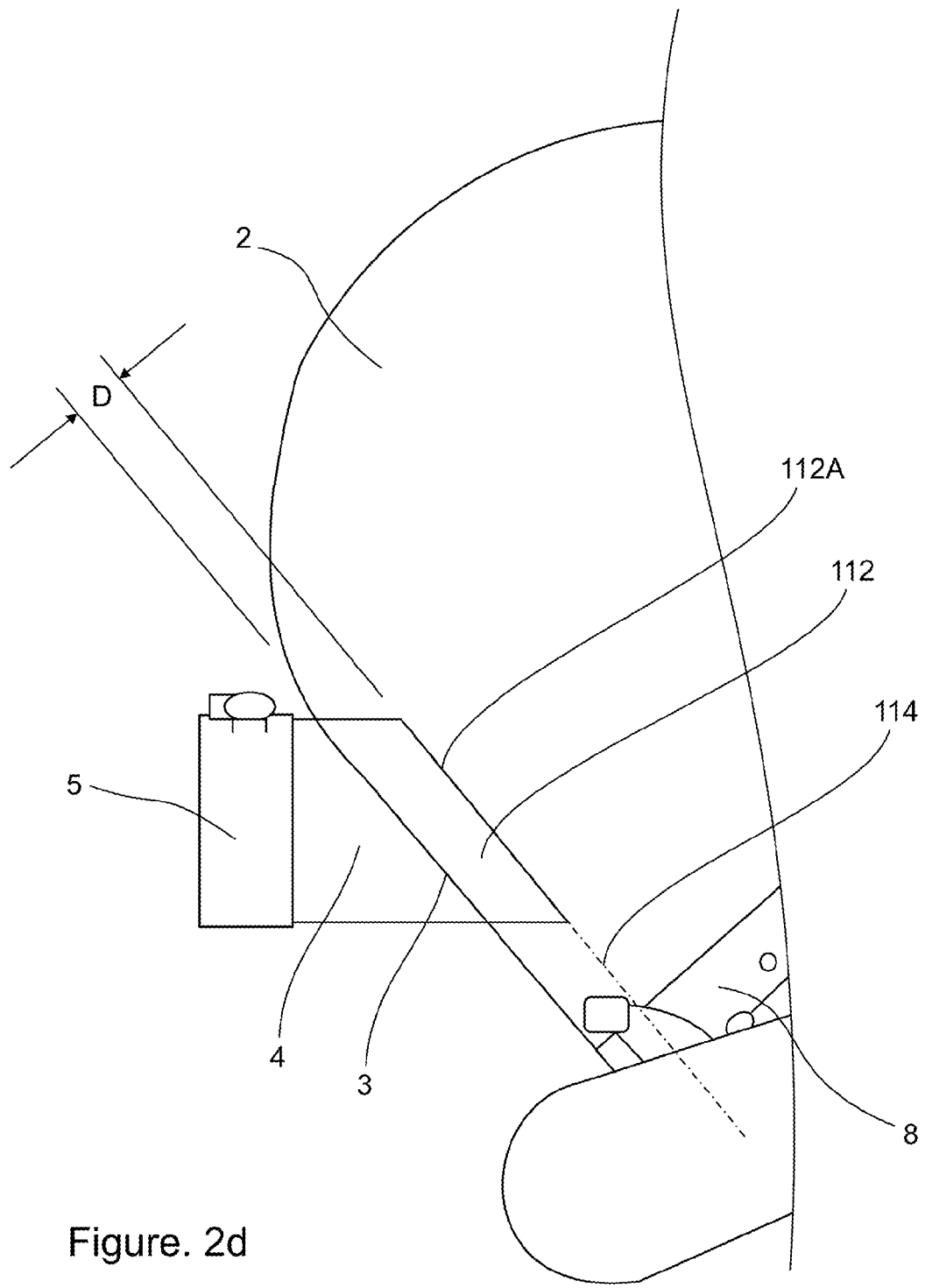
FIG. 2d is a simplified block diagram illustrating an inlet port for use with the inlet conduit according to one embodiment of the invention.

The inlet port 4 can have an approximately constant cross section and has an end portion 112 protruding into the air-particulates separating chamber 2 a predetermined distance D of approximately 2" to 3" in close proximity to the auger 8, as illustrated in FIG. 2d. The inlet port ends 112A in a plane 114 can be oriented substantially parallel to an inside wall surface 3 of the air-particulates separating chamber 2.

In operation, the increase of the cross section of the conduit reduces the velocity of the airstream with the particulates from the velocity in the vacuum hose to a velocity in the inlet port 4 which depends on the ratio of the cross section of the vacuum hose to the second cross section. With the velocity of the airstream with the particulates entering the air-particulates separating chamber 2 being dependent upon the suction provided by the suction mechanism 6 thereto, the stepwise increase of the cross section in the inlet conduit 100 enables an increase of the velocity of the airstream with the particulates through the vacuum pickup hose—resulting in an increased transmission of particulates therethrough—while the suction provided by the suction mechanism is substantially the same. Alternatively, the velocity of the airstream with the particulates through the vacuum hose is kept constant by reducing the suction, resulting in a lower velocity of the airstream with the particulates entering the air-particulates separating chamber 2 and consequently, in improved separation of the particulates from the airstream and reduced power consumption of the suction mechanism 6.

The inlet conduit 100—length of the inlet elements 102 and 104, change of the cross sections—is designed using common knowledge in fluid dynamics based on the suction provided by the suction mechanism, the length and cross section of the vacuum hose, and the type of particulates to be transmitted.

In an exemplary implementation the inlet conduit 100 has been designed for a particulate loader having suction of 130" of H2O, for transmitting grain through a 7" or 8" vacuum hose of length 10 ft to 70 ft. The cross section is increased in a first step from a diameter of 7" or 8" vacuum hose in the respective vacuum hose adapter 108 to the first cross section having a diameter of 9" and in a second step from the first cross section to the second cross section having a diameter of 10" with the inlet conduit elements 102 and 104 each having a length of approximately 28.5".

The present invention has been described herein with regard to certain embodiments. However, it will be obvious to persons skilled in the art that a number of variations and modifications can be made without departing from the scope of the invention as described herein.

What is claimed is:

1. A particulate loader for transferring particulates comprising:
    an air-particulates separating chamber for separating the particulates from an air stream caused by suction provided thereto;
    a suction mechanism connected to the air-particulates separating chamber for providing the suction thereto;
    a conveying mechanism for conveying the separated particulates from the air-particulates separating chamber to a remote location;
    a vacuum pickup hose or pipe configured to be in fluid communication with the air-particulates separating chamber for transmitting the air stream with the particulates therethrough; and,
    an inlet conduit connectable to the vacuum pickup hose or pipe at a first end and in fluid communication with the air-particulates separating chamber at a second end for transmitting the air stream with the particulates from the vacuum pickup hose or pipe to the air-particulates separating chamber, wherein the inlet conduit is elongated between the first end and the second end and wherein a diameter of a cross-section of the inlet conduit increases by at least one inch from a first cross-section at the first end to a second cross-section at the second end, the inlet port having an approximately constant cross section, wherein the air-particulates separating chamber comprises an inlet port in fluid communication with the inlet conduit, and wherein inlet port protrudes into the air-particulates separating chamber a predetermined distance.

2. The particulate loader according to claim 1 wherein the cross-section of the inlet conduit increases in a stepwise fashion.

3. The particulate loader according to claim 2 wherein the cross-section of the inlet conduit increases in at least two steps.

4. The particulate loader according to claim 3 wherein the inlet conduit has the second cross-section along a substantial portion of its length.

5. The particulate loader according to claim 4 wherein the inlet conduit has an intermediate cross-section along another substantial portion of its length.

6. The particulate loader according to claim 5 wherein the inlet conduit comprises a first inlet element having the intermediate cross-section and a second inlet element having the second cross-section, the first inlet element being telescopically movable with respect to the second inlet element.

7. The particulate loader according to claim 1 wherein the inlet conduit is designed such that a velocity of the air stream with the particulates through the vacuum pickup hose or pipe is increased while the suction provided by the suction mechanism is substantially the same.

8. The particulate loader according to claim 1 wherein the inlet conduit comprises a first inlet element and a second inlet element, the first inlet element being telescopically movable with respect to the second inlet element.

9. The particulate loader according to claim 1 wherein inlet port ends in a plane oriented substantially parallel to an inside wall surface of the air-particulates separating chamber.

10. The particulate loader of claim 3 wherein each of the at least two steps comprises a change in the diameter of the cross-section of the inlet conduit of at least one inch.

11. The particulate loader of claim 1 wherein the diameter of the cross-section of the inlet conduit increases by exactly one inch from the first cross-section at the first end to the second cross-section at the second end.

12. The particulate loader of claim 1 wherein the diameter of the cross-section of the inlet conduit increases by one inch or two inches from the first cross-section at the first end to the second cross-section at the second end.

13. The particulate loader of claim 1 wherein the inlet conduit has a fixed length.

14. The particulate loader of claim 8 further comprising a sealing ring positioned between the first inlet element and the second inlet element for sealing the first inlet element and the second inlet element relative to each other.

15. The particulate loader of claim 1 wherein the inlet conduit is aligned with and parallel to an inlet port of the air-particulates separating chamber.

16. A particulate loader for transferring particulates comprising:
an air-particulates separating chamber for separating the particulates from an air stream caused by suction provided thereto;
a suction mechanism connected to the air-particulates separating chamber for providing the suction thereto;
a conveying mechanism for conveying the separated particulates from the air-particulates separating chamber to a remote location;
a vacuum pickup hose or pipe configured to be in fluid communication with the air-particulates separating chamber for transmitting the air stream with the particulates therethrough, and
an inlet conduit connectable to the vacuum pickup hose or pipe at a first end and in fluid communication with the air-particulates separating chamber at a second end for transmitting the air stream with the particulates from the vacuum pickup hose or pipe to the air-particulates separating chamber, wherein the inlet conduit is elongated between the first end and the second end and wherein a cross-sectional area of the inlet conduit increases by at least 23% from a first cross-section at the first end to a second cross-section at the second end, wherein the air-particulates separating chamber comprises an inlet port in fluid communication with the inlet conduit, the inlet port having an approximately constant cross section, and wherein inlet port protrudes into the air-particulates separating chamber a predetermined distance.

* * * * *